United States Patent [19]

Stoner

[11] 4,192,412
[45] Mar. 11, 1980

[54] CENTRIFUGAL CLUTCH WITH SHOE STOPS

[75] Inventor: Larry L. Stoner, Massilon, Ohio

[73] Assignee: Aspro, Inc., Canton, Ohio

[21] Appl. No.: 918,783

[22] Filed: Jun. 26, 1978

[51] Int. Cl.² ........................................... F16D 43/18
[52] U.S. Cl. ........................................... 192/105 CD
[58] Field of Search ............... 192/105 CD, 105 CE, 192/105 BA, 103 B; 188/184

[56] References Cited

U.S. PATENT DOCUMENTS

| | | | |
|---|---|---|---|
| 2,047,077 | 7/1936 | Lansing | 192/105 CD |
| 2,626,034 | 1/1953 | Fawick | 192/105 CD |
| 2,685,946 | 8/1954 | Pferd et al. | 188/184 |
| 2,801,724 | 8/1957 | Sproul | 192/105 CD |
| 3,687,254 | 8/1972 | Brystrom | 192/105 BA |
| 4,016,964 | 4/1972 | Dietzsch et al. | 192/105 CD |

FOREIGN PATENT DOCUMENTS

| | | | |
|---|---|---|---|
| 568406 | 12/1958 | Belgium | 192/105 CD |
| 1807397 | 5/1970 | Fed. Rep. of Germany | 192/105 CD |

*Primary Examiner*—Benjamin Wyche
*Attorney, Agent, or Firm*—Frease & Bishop

[57] ABSTRACT

A centrifugal clutch has an axially extending hub formed with a central bore for receiving and mounting the clutch on a drive shaft. A drive flange is attached to the hub for rotation with the hub when it is rotated by the drive shaft. A pair of clutch shoes is pivotally mounted on the drive flange in an end-to-end relationship with respect to each other by a pair of pivot pins. Extension springs bias the swinging ends of the clutch shoes toward retracted position. The clutch shoes are adapted to move outwardly under the influence of centrifugal force and overcome the biasing effect of the springs to drivingly engage a concentrically mounted clutch housing. Each of the clutch shoes has an arcuate-shaped web and an outer shoe table with a strip of frictional material being mounted on the table. An inwardly extending projection is formed integrally as a part of each shoe web adjacent the respective pivot pin and is adapted to abut against the hub when the shoes are in retracted position to prevent further inward movement of the shoes due to the biasing of the springs.

3 Claims, 6 Drawing Figures

CENTRIFUGAL CLUTCH WITH SHOE STOPS

CROSS REFERENCE TO RELATED APPLICATION

This invention pertains to a modification shown but not claimed in copending application Ser. No. 907,925, filed May 22, 1978, which is assigned to the same Assignee as this application.

BACKGROUND OF THE INVENTION

1. Field of the Invention

The invention relates to clutches which are operated automatically by centrifugal force at a predetermined speed of rotation so as to connect a driving member to a driven member or load. More particularly, the invention relates to a centrifugal clutch construction of the type having a pair of pivotally mounted clutch shoes which swing outwardly into coupling engagement with a driven clutch member and in which a stop projection is formed integrally on each of the clutch shoe webs for engagement with a hub when the shoes return to a fully disengaged position.

2. Description of the Prior Art

There are numerous types and arrangements of centrifugal clutch constructions in which one or more clutch shoes are retained in retracted position by springs until sufficient centrifugal force acts on the shoes to overcome the force of retaining springs, whereupon the clutch shoes pivot and swing outwardly and engage a stationary clutch housing or drum.

Many of these clutch constructions have a pair of arcuate-shaped clutch shoes which are pivotally mounted on a clutch backing plate and arranged in an end-to-end relationship with respect to each other. The backing plate in turn is fixed to a drive shaft or hub for rotation with the drive shaft. These clutch shoes have various spring arrangements which bias the shoes toward and retain the shoes in retracted position. It is this spring retaining tension which must be overcome by the centrifugal force before the clutch shoes engage the driven member.

Stop means must be provided on the clutch rotor to contact the clutch shoes upon their return to retracted position at a predetermined location with respect to the driven drum. Most known clutch constructions use a separate component which is attached in some manner to the backing plate or drive flange which is engaged by the clutch shoe upon its return to retracted position. These separate stop components require additional manufacturing steps and may present maintenance problems, all of which increase the cost of the clutch and reduce its efficiency and life span. Likewise, these separate stop components may restrict the use of the various types and configurations of backing plates which may be required for particular applications.

There is no known centrifugal clutch construction of which I am aware which provides shoe stops as an integral portion of the clutch shoe by forming an inwardly extending projection on the web of the shoe, preferably adjacent the pivotal mounting opening for the shoe, which projection engages the rotor hub, preventing further inward movement of the shoes by the tension springs.

SUMMARY OF THE INVENTION

Objectives of the invention include providing an improved centrifugal clutch construction having a shoe stop formed integrally with the web of the shoe, which stop engages the rotor hub upon return of the clutch shoes to their retracted position by the tension springs; providing such a clutch construction in which the shoe webs may be formed of stamped sheet metal members with the stop projection being formed integrally therewith to provide a laminated clutch shoe web having sufficient strength and rigidity at a minimum cost; providing such a clutch construction in which the shoe webs are each formed with a discontinuous opening in which a bushing assembly is mounted for pivotally mounting the clutch shoes on a drive flange or backing plate, with the stop projection forming a portion of the pivotal mounting opening; providing such a clutch construction in which the integral shoe stops eliminate separate components previously required to be mounted on the backing plate or shoes, thereby enabling various types and configurations of backing plates to be used, permitting the clutch to be used in different installations which heretofore may have been difficult; and providing such a centrifugal clutch construction which is of a relatively simple arrangement, easy to manufacture and assemble, sturdy and durable in use, and which eliminates difficulties heretofore encountered with other known clutch shoe stop constructions, which achieves the objectives indicated and solves problems and satisfies needs existing in the art.

These objectives and advantages are obtained by the improved centrifugal clutch construction of the type having a driven clutch member, axially extending hub means, drive flange means mounted on the hub means for rotation with the hub means, pin means mounted on the drive flange means, a pair of clutch shoes pivotally mounted on the pin means and arranged in end-to-end relationship with respect to each other and movable between engaged and disengaged positions with respect to the driven clutch member, said shoes each having a web and a curved outer shoe table, and spring means operatively engaged with the clutch shoes biasing the clutch shoes toward the disengaged position, wherein the improvement includes stop means formed integrally with each of the clutch shoe webs and engageable with the hub means when the clutch shoes are in disengaged position, said stop means being a projection extending inwardly from the shoe web toward the hub means.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

Similar numerals refer to similar parts throughout the drawings.

DESCRIPTION OF THE PREFERRED EMBODIMENT

The improved clutch construction incorporating the shoe stops of the present invention therein, is indicated generally at 1, and is shown particularly in FIGS. 1–4. Clutch 1 is intended to be driven in a usual manner by a power shaft (not shown). Clutch 1 includes a rotor assembly 3 (FIGS. 3 and 4), and a driven clutch member or housing 4. The clutch is shown in disengaged position with housing 4 in FIGS. 1 and 3 and in engaged position in FIGS. 2 and 4.

Figure 3:
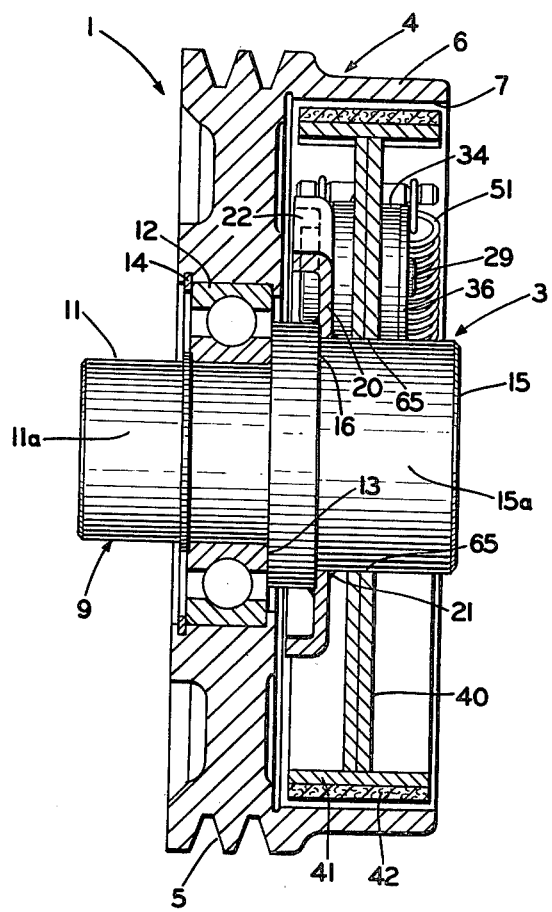
FIG. 3 is a sectional view taken on line 3—3, FIG. 1, with the shoe stops being shown in engaged position with the rotor hub.
Figure 4:
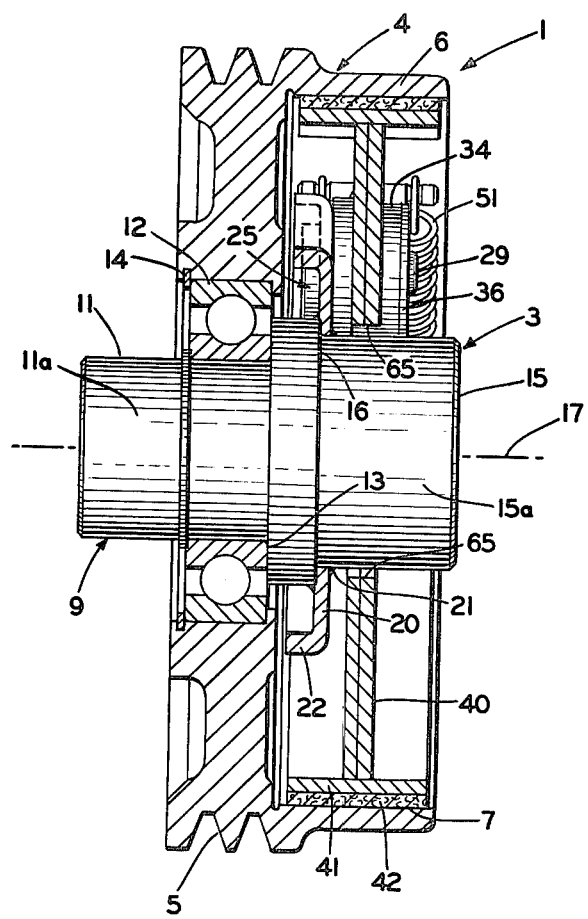
FIG. 4 is a sectional view taken on line 4—4, FIG. 2, with the shoe stops being shown in disengaged position with the rotor hub.

Housing 4 is shown as an integral pulley clutch housing having a multi-V-grooved pulley end formation 5 which is connected to a cylindrical housing drum wall 6 (FIGS. 3 and 4). The inner surface 7 of drum wall 6 provides the coupling surface for drivingly connecting clutch housing 4 with rotor assembly 3. Housing 4 may have various configurations and arrangements and may be adapted to be operatively engaged with mechanisms other than a multi-V-grooved pulley belt without departing from the concept of the present invention.

Rotor assembly 3 includes a hub 9 which is adapted to be mounted on and secured to a drive shaft by a key-keyway arrangement or other attachment means so as to rotate with the drive shaft. Hub 9 has a smooth cylindrical internal bore 10 in which the drive shaft is telescopically inserted. Hub 9 further includes a reduced end 11 which is provided with a cylindrical outer surface 11a on which driven clutch housing 4 is rotatably mounted by a bearing ring 12 (FIGS. 3 and 4). Bearing ring 12 is located between an inner annular shoulder 13 formed on hub 9 and a snap ring 14 which maintains bearing ring 12 in position against shoulder 13.

The other end 15 of hub 9 is provided with a cylindrical outer surface 15a having a larger diameter than that of end surface 11a. End 15 also terminates in an inner annular shoulder 16 which extends radially with respect to the central axis or center line 17 of rotor assembly 3 and parallel with annular shoulder 13. A rectangular-shaped drive flange, indicated generally at 20, is mounted on rotor hub end 15 and secured thereon against shoulder 16 by circular welds or brazed areas indicated at 21 (FIGS. 3 and 4). Drive flange 20 is formed with out-turned stiffening marginal flanges 22.

A pair of pins 25 (FIG. 6) is mounted on drive flange 20 and extends outwardly therefrom in a cantilever-type manner. Pins 25 each include a cylindrical shank 26 terminating at one end in a generally circular head 27 and on the outer end in a reduced tubular projection 29. Pin head 27 has a flat side 28. Pins 25 extend through holes 30 which are formed in drive flange 20 which are complementary in diameter to shanks 26. Flat sides 28 of pins 25 extend parallel with the associated top and bottom reinforcing flange 22 to provide clearance for the pin heads and to prevent any possible rotation of the pins with respect to drive flange 20.

Figure 5:
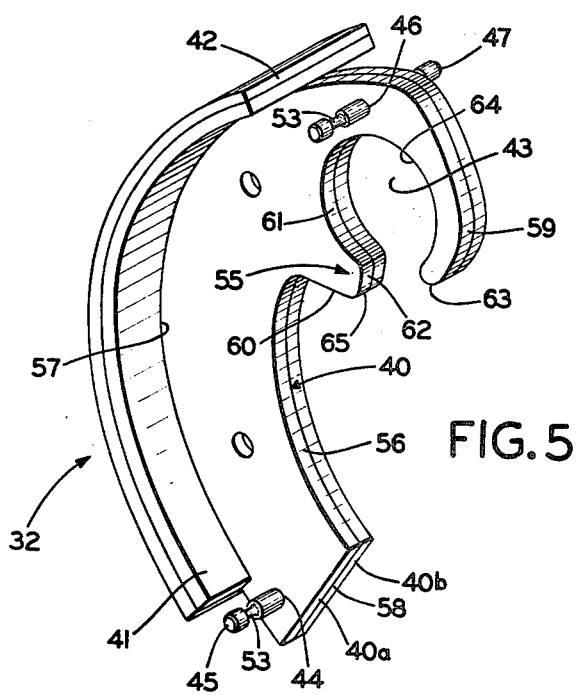
FIG. 5 is a perspective view of the clutch shoe having the improved stop formed integrally thereon.
Figure 6:
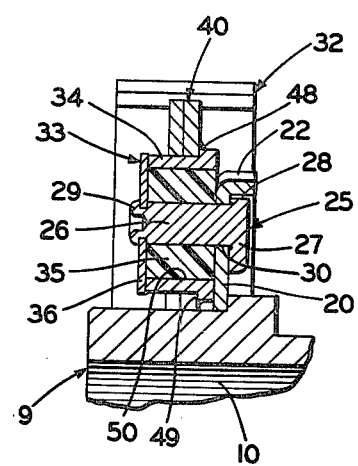
FIG. 6 is a fragmentary sectional view taken on line 6—6, FIG. 1.

A pair of arcuate-shaped clutch shoes, indicated generally at 32 (FIGS. 1, 2 and 5), are pivotally mounted on drive flange 20 by pins 25 and are arranged in an end-to-end relationship with respect to each other. Clutch shoes 32 are pivotally mounted on pins 25 by bushing assemblies 33 (FIG. 6). Each bushing assembly 33 includes an outer metal bushing sleeve 34 and an inner bushing 35. Bushing 35 preferably is formed of a high strength plastic and is retained within sleeve 34 by an end washer 36. Outer end 29 of pin 25 is staked against washer 36 after mounting shoes 32 on bushing assembly 33.

Each clutch shoe 32 includes a web 40 formed by a pair of stamped metal web plates 40a and 40b (FIG. 5), to provide a laminated shoe web construction. An arcuate shoe table 41 is staked brazed or welded to the outer periphery of each shoe web 40 and has a strip of function material 42 bonded thereto by an adhesive or other means. Each shoe web 40 is formed with a discontinuous circular cut-out opening 43 at one end for pivotally mounting the clutch shoes on pins 25. A hole 44 is formed at the opposite end of each shoe web for receiving a spring pin 45 therein. Second spring pin holes 46 also are formed in the shoe webs adjacent to openings 43 for receiving second spring pins 47. Pins 45 and 47 preferably have a knurled center portion which provides a force fit with the edges of holes 44 and 46.

Bushing sleeves 34 preferably are secured within shoe openings 43 by welds or brazed areas 48 with shoulders 49 formed on sleeves 34 abutting shoe webs 40. Bushings 35 are telescopically mounted by a force fit within cylindrical bores 50 of sleeves 34.

Bushing assemblies 33, in combination with cantilever pins 25 provide the pivotal mounting for the clutch shoes 32, which when acted upon by sufficient centrifugal force, pivot outwardly into driving engagement with housing wall surface 7 without becoming disengaged from pins 25 as in some prior art clutch constructions.

A pair of extension springs 51 extends between each pair of spring pins 45 and 47 to bias the swinging ends of clutch shoes 32 toward retracted position. Each spring 51 has a pair of hook-shaped ends 52 which are engaged in grooves 53 formed in the ends of pins 45 and 47.

In accordance with the invention, each clutch shoe web 40 is formed with a shoe stop projection, indicated generally at 55 (FIG. 5), which is adapted to engage hub end surface 15a when the clutch shoes are in retracted disengaged position. Shoe webs 40 are formed with inner and outer arcuate edges 56 and 57 which are concavely and convexly shaped, respectively. Inner and outer edges 56–57 terminate at a swinging end edge 58 which extends in a generally radial direction with respect to clutch axis 17.

The opposite end of web 40 is formed with an arcuate-shaped, inturned, finger-like flange 59. Web projection 55 has a generally truncated configuration defined by a straight side edge 60, a concavely curved side edge 61, and a straight top edge 62. Concave edge 61 of projection 55 and inner edge 64 of flange 56, together define the periphery of pivot cut-out opening 43. The outer end 63 of flange 59 is spaced from projection edge 62 providing a discontinuous configuration to cut-out opening 43. Opening 43 is greater than 180°, preferably having a circumferential opening defining edge of approximately 275°.

Projections 55 are formed integrally with the remaining portions of web 40 which are stamped in a single or series of metal stamping operations, thereby providing an inexpensive arrangement.

The operation of improved clutch 1 is described below. Clutch shoes 32 are held in retracted position (FIGS. 1 and 3) by springs 51. Shoe web projections 55 engage hub end outer surface 15a preventing further inward movement of clutch shoes 32. Preferably, a projection stop corner 65, which is formed at the junction of top edge 62 and side edge 60, is in abutting engagement with hub surface 15a when the clutch shoes are in retracted position, as shown in FIGS. 1 and 3.

The retracted or unactuated clutch position of FIGS. 1 and 3 occurs when rotor assembly 3 is at rest or at a speed which is below a predetermined engagement speed. This inward retracted position of the clutch shoes provides a predetermined gap or spacing 66 (FIG. 1) between shoe friction material 42 and inner surface 7 of clutch housing 4, enabling rotor assembly 3 to rotate freely without affecting stationary clutch housing 4.

Figure 1:
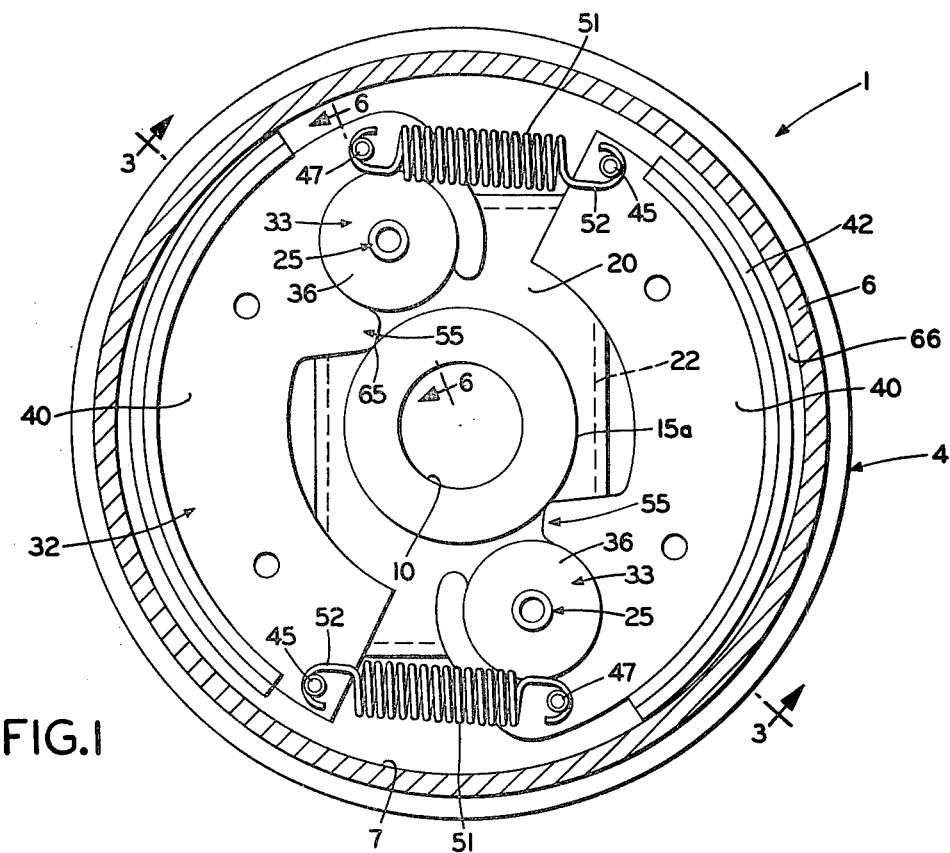
FIG. 1 is a front elevational view of a centrifugal clutch shown in retracted position within a clutch housing shown in section, and with the shoe stops being engaged with the rotor hub.
Figure 2:
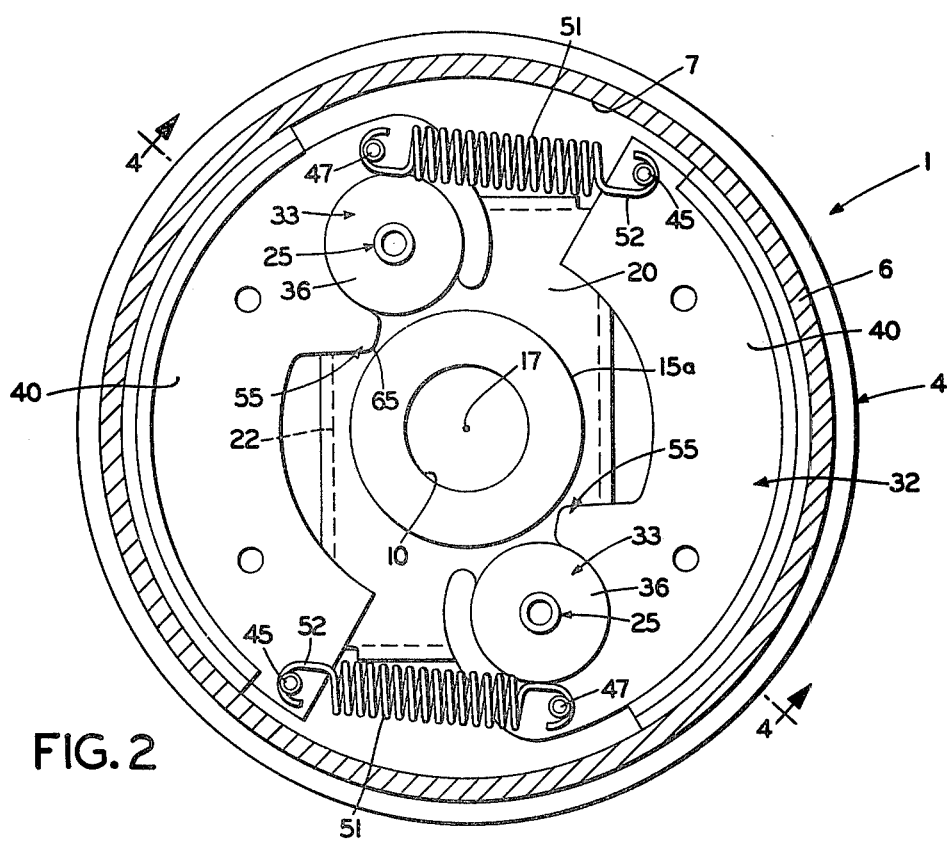
FIG. 2 is a front elevational view similar to FIG. 1 with the clutch shown in engaged position with the clutch housing, with the shoe stops being disengaged from the rotor hub.

Shoes 32 attempt to move radially outwardly from their retracted position of FIG. 1 under the influence of centrifugal force as the rotational speed of the drive shaft increases. The predetermined resistance of springs 51 retains the shoes in disengaged position until the shaft reaches the predetermined engagement speed. Upon reaching this engagement speed, clutch shoes 32 move outwardly until friction material strips 42 drivingly engage drum wall 7, as shown in FIGS. 2 and 4. This coupling engagement rotates housing 4 together with rotor assembly 3 to operatively drive a pulley V-belt (not shown) extending about and seated within the pulley V-grooves. The engagement speed of the clutch is dependent upon a number of known and determinable factors, such as the weight of clutch shoes 32, the load rate of springs 51, location of pins 25, etc.

Clutch shoes 32 will maintain their driving engagement with driven clutch member 4 until the speed of the drive shaft decreases to a predetermined level, whereupon the centrifugal force exerted on the shoes is overcome by the biasing force of springs 51. At the disengagement speed, springs 51 will retract the shoes from the position of FIGS. 2 and 4 to that of FIGS. 1 and 3.

The above described centrifugal clutch operation is typical for various types of centrifugal clutch constructions using pivotally mounted shoes with spring retainers.

When clutch shoes 32 begin to move outwardly from the disengaged clutch position of FIGS. 1 and 3, corner 65 or stop projections 55 will disengage hub surface 15a until shoes 32 return to their fully retracted position by springs 51.

The improved centrifugal clutch shoe stops 55 provide a positive stop action with rotor hub 9 to properly position the clutch shoes in their retracted positions, maintaining a continuous spacing or shoe gap 66 which will only be affected by wear of friction material 42. Due to the location of projections 55 adjacent pivot pins 25, projections 55 will experience a smaller stopping force when engaging hub 9 than if placed outwardly on or along clutch shoes 32 a greater distance from the pivot point. Projections 55 likewise eliminate the need of any additional components being mounted on the shoe or on the drive flange, as heretofore required in prior clutch constructions, reducing the cost of the additional components and assembly procedures.

Accordingly, the improved centrifugal clutch construction provides a construction which is simplified, effective, safe, durable, inexpensive and efficient, which achieves all of the enumerated objectives, provides for eliminating difficulties encountered with prior clutch constructions and devices, and which solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved centrifugal clutch shoe stop construction is constructed, assembled and operated, the characteristics of the new construction, and the advantageous, new and useful results obtained; the new and useful structures, devices, elements, arrangements, parts, and combinations are set forth in the appended claims.

I claim:

1. In an improved centrifugal clutch construction of the type having a driven clutch member and a drive clutch rotor, said rotor including axially extending hub means, drive flange means mounted on the hub means for rotation with the hub means, pin means mounted on the drive flange means, a pair of clutch shoes pivotally mounted on the pin means and arranged in end-to-end relationship with respect to each other and movable between engaged and disengaged positions with respect to the driven clutch member, said shoes each having a web and a curved outer shoe table, and spring means operatively engaged with the clutch shoes biasing said clutch shoes toward the disengaged position, wherein the improvement includes stop means formed on each of the clutch shoe webs and engageable with the hub means when the clutch shoes are in disengaged position, said stop means being a projection formed integrally with each shoe web and extending inwardly from the shoe web toward the hub means; each of the shoe webs having an arcuate configuration formed by curved outer and inner edges which terminate in first and second end edges with opening means being formed in each of the shoe webs adjacent the first end edges for receiving the pivot pin means; and said opening means having a discontinuous circular opening greater than 180° with the stop means projections defining a portion of said opening means.

2. In an improved centrifugal clutch construction of the type having a driven clutch member and a drive clutch rotor, said rotor including axially extending hub means, drive flange means mounted on the hub means for rotation with the hub means, pin means mounted on the drive flange means, a pair of clutch shoes pivotally mounted on the pin means and arranged in end-to-end relationship with respect to each other and movable between engaged and disengaged positions with respect to the driven clutch member, said shoes each having a web and a curved outer shoe table, and spring means operatively engaged with the clutch shoes biasing said clutch shoes toward the disengaged position, wherein the improvement includes stop means formed on each of the clutch shoe webs and engageable with the hub means when the clutch shoes are in disengaged position, said stop means being a projection formed integrally with each shoe web and extending inwardly from the shoe web toward the hub means, with the shoe webs being formed by a plurality of stamped-metal plates forming a laminated construction.

3. In an improved centrifugal clutch construction of the type having a driven clutch member and a drive clutch rotor, said rotor including axially extending hub means, drive flange means mounted on the hub means for rotation with the hub means, pin means mounted on the drive flange means, a pair of clutch shoes pivotally mounted on the pin means and arranged in end-to-end relationship with respect to each other and movable between engaged and disengaged positions with respect to the driven clutch member, said shoes each having a web and a curved shoe table, and spring means operatively engaged with the clutch shoes biasing said clutch shoes toward the disengaged position, wherein the improvement includes stop means formed on each of the clutch shoe webs and engageable with the hub means when the clutch shoes are in disengaged position, said stop means being a projection formed integrally with each shoe web and extending inwardly from the shoe web toward the hub means; and the stop means projections each having a generally truncated configuration defined by two side edges and a top edge with one of the side edges being generally straight and the other side edge being curved concavely with the straight side edge and top edge meeting to form a corner, and with said corner being in abutting engagement with the hub means when the clutch shoe is in disengaged position.

* * * * *

UNITED STATES PATENT AND TRADEMARK OFFICE
CERTIFICATE OF CORRECTION

PATENT NO. : 4,192,412
DATED      : March 11, 1980
INVENTOR(S) : Larry L. Stoner It is certified that error appears in the above–identified patent and that said Letters Patent are hereby corrected as shown below:

Column 3, line 14, change "power shaft" to -power drive shaft-

Column 3, line 56, change "outer" to -other-

Column 4, lines 12-13, change "function" to -friction-

Column 7, line 11, change "curved shoe table" to -curved outer shoe table-

Signed and Sealed this

Seventeenth Day of June 1980

[SEAL]

Attest:

Attesting Officer

SIDNEY A. DIAMOND

Commissioner of Patents and Trademarks